US010754530B2

(12) United States Patent
Kimura

(10) Patent No.: US 10,754,530 B2
(45) Date of Patent: Aug. 25, 2020

(54) CONTROL APPARATUS FOR NETWORK CAMERA, CONTROL METHOD, AND STORAGE MEDIUM

(71) Applicant: CANON KABUSHIKI KAISHA, Tokyo (JP)

(72) Inventor: Takumi Kimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 15/917,399

(22) Filed: Mar. 9, 2018

(65) Prior Publication Data
US 2018/0267698 A1    Sep. 20, 2018

(30) Foreign Application Priority Data
Mar. 17, 2017    (JP) .................................. 2017-052166

(51) Int. Cl.
G06F 3/0484 (2013.01)
G06F 3/038 (2013.01)
G06F 3/0354 (2013.01)

(52) U.S. Cl.
CPC .......... *G06F 3/04847* (2013.01); *G06F 3/038* (2013.01); *G06F 3/03548* (2013.01)

(58) Field of Classification Search
None
See application file for complete search history.

(56) References Cited

U.S. PATENT DOCUMENTS

| 2004/0071304 A1* | 4/2004 | Yanz | H04R 25/70 |
| | | | 381/312 |
| 2009/0228828 A1 | 9/2009 | Beatty | |
| 2016/0283106 A1 | 9/2016 | Thorne | |
| 2016/0364123 A1* | 12/2016 | Burns | G06F 16/71 |

(Continued)

FOREIGN PATENT DOCUMENTS

| JP | 9-198224 A | 7/1997 |
| JP | 2017-017503 A | 1/2017 |

OTHER PUBLICATIONS

Events demo in asp.net MVC Slider control, Nov. 20, 2016, the whole document, URL: http://web.archive.org/web/20161120031022/http://demos.telerik.com:80/aspnet-mvc/slider/events, telerik.com, Headquarters: Sofia, Bulgaria.

(Continued)

*Primary Examiner* — Amare Mengistu
*Assistant Examiner* — Sarvesh J Nadkarni
(74) *Attorney, Agent, or Firm* — Canon U.S.A., Inc. I.P. Division

(57) ABSTRACT

A control apparatus of a network camera includes a determination unit configured to determine an overlapping state of a cursor with each of a slider bar and a slider thumb, which configure a slider control, on a display screen of a display unit, a decision unit configured to decide information that relates to the slider control and is to be displayed on the display unit, based on a condition corresponding to a result of the determination by the determination unit, a display control unit configured to display the information (Continued)

decided by the decision unit on the display unit, and a transmission unit configured to transmit, to the network camera, a control signal that corresponds to a position of the slider thumb and is changed in response to input of an instruction by a user.

17 Claims, 10 Drawing Sheets

(56) References Cited

U.S. PATENT DOCUMENTS

2017/0003860 A1    1/2017   Kozakura

OTHER PUBLICATIONS

IBM, Slider Control for Graphical User Interfaces, IBM Technical Disclosure Bulletin, Mar. 3, 1994, pp. 11-12, vol. 37, No. 03, IBM, Armonk, New York.
Events demo in Asp.Net MVC Slider/Events, Nov. 20, 2016 (Downloaded: Jun. 22, 2018), the whole document, XP055487236, URL: http://web.archive.org/web/20161120031022/http://demos.telerik.com:80/aspnet-mvc/slider/events.
Github: Slider/Inputs/Outputs, Jan. 1, 2017 (Downloaded: Apr. 28, 2020) http://web.archive.org/web/20170101232505/http://angular.github.io/react-native-renderer/slider.html.
2,000 Things You Should Know About WPF: Everything a WPF Developer Needs to Know, in Bite-Sized Chunks, Mar. 12, 2014 (Downloaded: Apr. 28, 2020) https://wpf.2000things.com/tag/slider/.

* cited by examiner

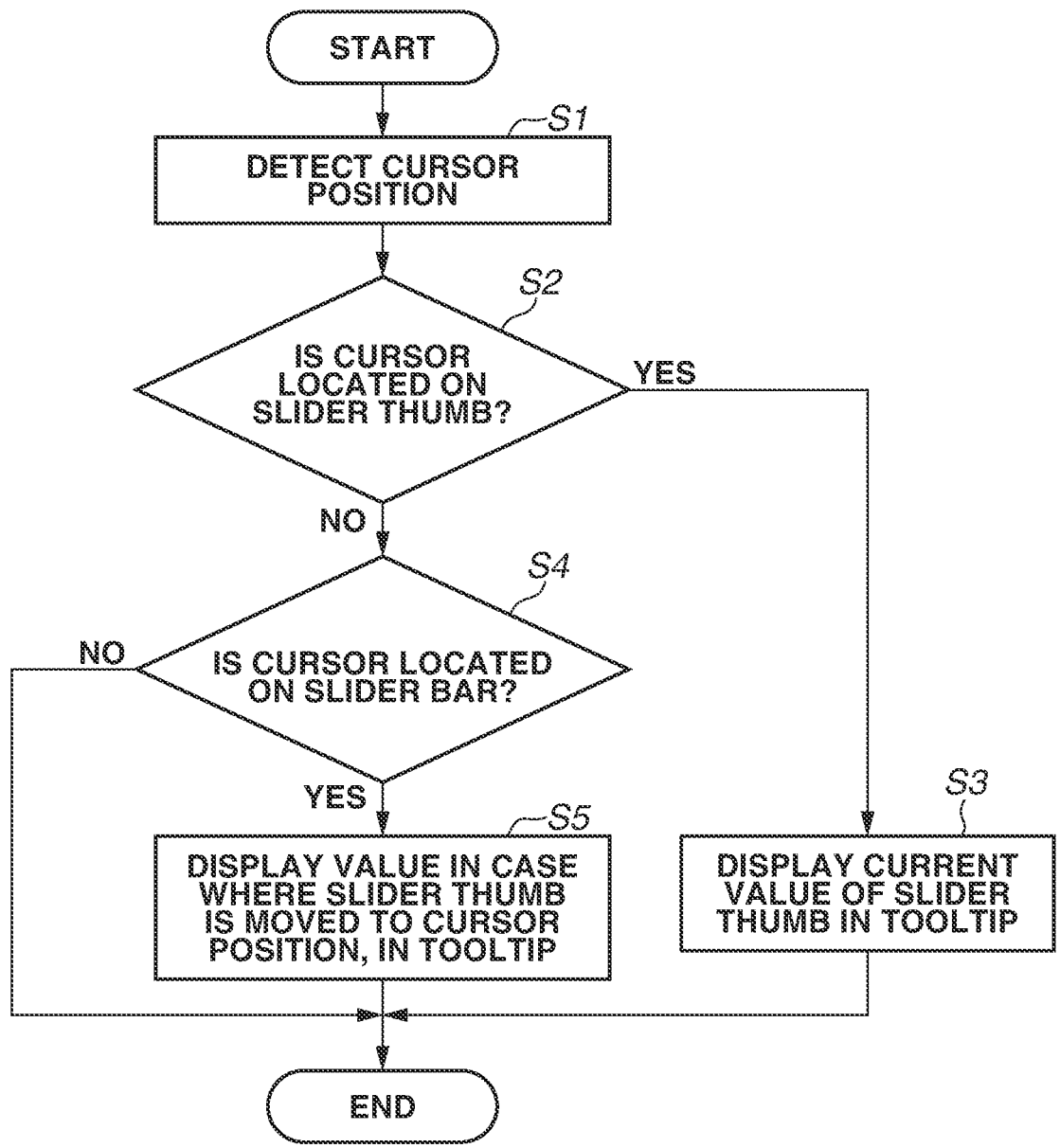

CONTROL APPARATUS FOR NETWORK CAMERA, CONTROL METHOD, AND STORAGE MEDIUM

BACKGROUND OF THE INVENTION

Field of the Invention

The present invention relates to an information processing apparatus, an information processing method, and a storage medium.

Description of the Related Art

A slider control is used as a graphical user interface (GUI) of application software. The slider control is the GUI in which a slider thumb (tab) is linearly moved along a slider bar through methods such as a drag operation by a mouse and a swipe operation on a touch panel, to receive an operation from a user. Japanese Patent Application Laid-Open No. 9-198224 discusses a slider control that includes a pair of main slider bar for specification of a value and a slider bar for specification of a range of the value. In this case, the value corresponding to a position of the slider thumb is displayed on a window near the slider thumb.

In the slider control, a value of a movement destination is displayed in a tooltip when a cursor is placed on the slider bar or while the slider thumb is dragged. In such a slider control, a value corresponding to the cursor position is displayed in the tooltip.

In the slider control in which the slider thumb has a size astride the plurality of values, however, the value may be far from a current value of the slider thumb even when the cursor is located on the slider thumb. In this case, a value of a movement destination different from the current value of the slider thumb is displayed in the tooltip even though the cursor is located on the slider thumb in mouseover, which may make the user difficult to grasp the current value of the slider thumb.

SUMMARY OF THE INVENTION

The present invention is directed to a technology to appropriately present information relating to a slider control to a user.

According to an aspect of the present invention, an information processing apparatus includes a determination unit configured to determine an overlapping state of a cursor with each of a slider bar and a slider thumb, which configure a slider control, on a display screen of a display unit, a decision unit configured to decide information that relates to the slider control and is to be displayed on the display unit, based on a condition corresponding to a result of the determination by the determination unit, a display control unit configured to display the information decided by the decision unit on the display unit, and a transmission unit configured to transmit, to the network camera, a control signal that corresponds to a position of the slider thumb and is changed in response to input of an instruction by a user.

Further features of the present invention will become apparent from the following description of exemplary embodiments with reference to the attached drawings.

BRIEF DESCRIPTION OF THE DRAWINGS

FIG. 3 is a flowchart to explain display processing of a tooltip according to the exemplary embodiment of the present invention.

DESCRIPTION OF THE EMBODIMENTS

A preferred exemplary embodiment of the present invention is described in detail below with reference to accompanying drawings.

The exemplary embodiment described below is an example of implementation of the present invention and is appropriately modified or alternated depending on a configuration of an apparatus to which the present invention is applied and various kinds of conditions. The present invention is not limited to the exemplary embodiment described below.

Figure 1:
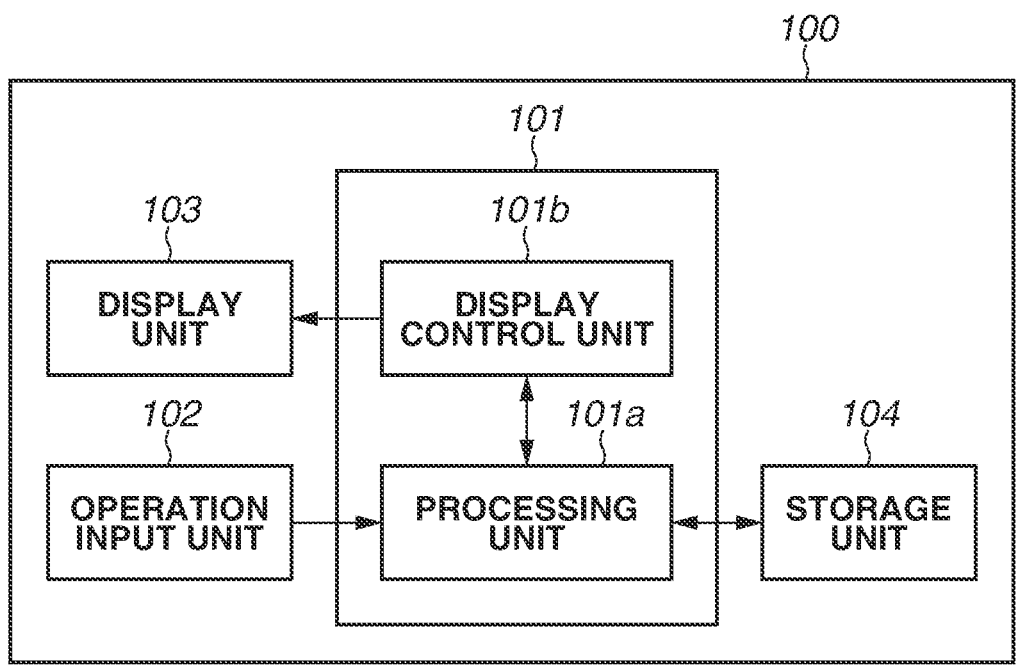
FIG. 1 illustrates a configuration example of an information processing apparatus according to an exemplary embodiment of the present invention.

FIG. 1 illustrates a configuration example of an information processing apparatus 100 according to the present exemplary embodiment. In the present exemplary embodiment, a case where the information processing apparatus 100 includes a personal computer (PC) is described. The information processing apparatus 100 is not limited to the PC, and can include a mobile terminal such as a tablet terminal or a smartphone.

The information processing apparatus 100 includes a control unit 101, an operation input unit 102, a display unit 103, and a storage unit 104. The control unit 101 includes a processing unit 101a and a display control unit 101b. The components illustrated in FIG. 1 each serve as dedicated hardware that configures the information processing apparatus 100. In this case, the components of FIG. 1 each operate as the dedicated hardware under control of a central processing unit (CPU) 221 of FIG. 10 described below.

The processing unit 101a generates, based on an instruction provided from a user through the operation input unit 102 described below, a control signal that causes the display unit 103 to display a graphical user interface (GUI), and outputs the control signal to the display control unit 101b. The display control unit 101b generates the GUI based on the control signal generated by the processing unit 101a, and performs display control to display the GUI on the display unit 103.

Figure 10:
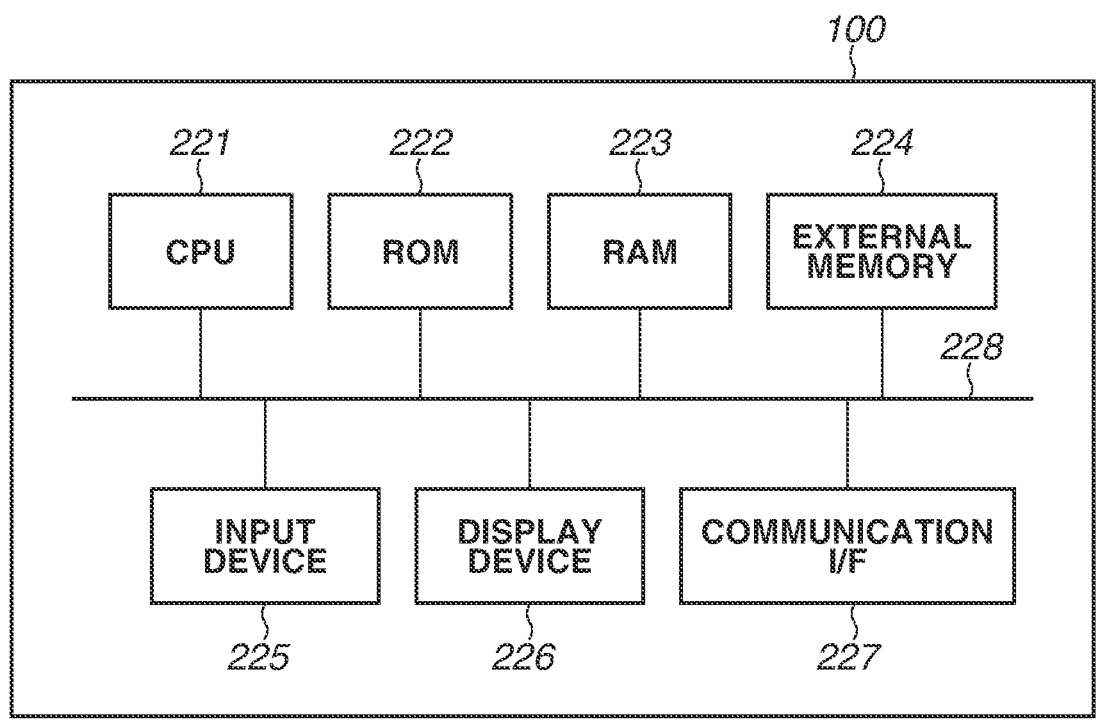
FIG. 10 is a diagram illustrating a hardware configuration of the information processing apparatus according to the exemplary embodiment of the present invention.

The control unit 101 can be configured as a processor such as a CPU. In a case where the control unit 101 is configured as the processor, the control unit 101 executes, for example, a program held by the storage unit 104 described below to achieve the above-described function of the control unit 101 and to control the components in the information processing apparatus 100. Further, the processing unit 101a and the display control unit 101b can be integrally configured. In FIG. 10, the CPU 221 includes the functions of the processing unit 101a and the display control unit 101b.

The operation input unit 102 includes, for example, a pointing device such as a keyboard, a mouse, or a touch panel, and inputs a user's instruction detected by the operation input unit 102 to the information processing apparatus 100. More specifically, various kinds of parameters necessary for processing by the processing unit 101a are input to the GUI displayed on the display unit 103, based on the user's instruction detected through the operation input unit 102.

The display unit 103 is a monitor that displays the GUI under the display control by the display control unit 101b. The display unit 103 can be the monitor such as a liquid crystal display (LCD). The display unit 103 can be provided outside the information processing apparatus 100, be connected to the information processing apparatus 100, and display the GUI under control of the information processing apparatus 100.

The storage unit 104 holds various kinds of setting values and data of the information processing apparatus 100. Further, in the case where the control unit 101 is configured as the processor, the storage unit 104 can hold a program executed by the control unit 101. The storage unit 104 can include, for example, a memory such as a random access memory (RAM) 222 and a read only memory (233) of FIG. 10 described below. The storage unit 104 can further include a computer-readable storage medium such as a hard disk drive (HDD). The storage unit 104 can be a removable external memory such as a flash memory or a memory card.

FIG. 10 is a diagram illustrating an example of a hardware configuration of the information processing apparatus 100 of FIG. 1 or FIG. 7 described below.

As illustrated in FIG. 10, the information processing apparatus 100 includes the CPU 221, the ROM 222, the RAM 223, an external memory 224, an input device 225, a display device 226, a communication interface (I/F) 227, and a system bus 228. The CPU 221 totally controls an operation in the information processing apparatus 100, and controls the component units (221 to 227) through the system bus 228. The ROM 222 is a nonvolatile memory that holds a control program, etc. necessary for execution of processing by the CPU 221. The program can be held by the external memory 224 or a removable storage medium (not illustrated). The RAM 223 functions as a main memory, a work area, etc. of the CPU 221. In other words, the CPU 221 loads the necessary program, etc. from the ROM 222 to the RAM 223 in execution of the processing, and executes the program, etc., thereby achieving various kinds of functional operations.

The external memory 224 holds, for example, various kinds of data and information necessary for processing using the program by the CPU 221. In addition, the external memory 224 holds, for example, various kinds of data and information that are obtained through the processing using the program by the CPU 221. The input device 225 includes the pointing device such as the keyboard, the mouse, or the touch panel as described above. The display device 226 includes a monitor such as a liquid crystal display (LCD).

The communication I/F 227 is an interface that controls communication between the information processing apparatus 100 and a camera 200.

Functions of at least a portion of the components in the information processing apparatus 100 illustrated in FIG. 10 are achievable when the CPU 221 executes the programs. Alternatively, at least a portion of the components in the information processing apparatus 100 illustrated in FIG. 10 can operate as dedicated hardware. In this case, the dedicated hardware operates under the control of the CPU 221.

FIGS. 2A to 2D each illustrate an example of the GUI that is generated by the display control unit 101b and is displayed on the display unit 103. More specifically, the display control unit 101b draws the GUI based on the program held by the storage unit 104, and the drawn GUI is displayed on the display unit 103. In the present exemplary embodiment, a case where the display control unit 101b generates a slider control 10 as the GUI and the slider control 10 is displayed on the display unit 103 is described.

The slider control 10 includes a linear slider bar 11 and a slider thumb 12 that is movable along the slider bar 11. The slider thumb 12 is also referred to as a "tab" and a "slider". A direction in which the slider bar 11 extends is arbitrary in a display screen of the display unit 103. Further, a scale 13 that indicates a position and a movement interval of the slider thumb 12 may be displayed near the slider bar 11. Furthermore, a numerical value (set value) corresponding to the position of the slider thumb 12 may be displayed near the scale 13. The scale 13 and the set value may not be displayed.

The slider thumb 12 can move within a range of predetermined values illustrated by the scale 13 at a predetermined interval. In the example illustrated in FIGS. 2A to 2D, the slider thumb 12 is movable by one within a range of 0 to 20. The user uses the operation input unit 102 to click a position while a cursor 21 on the display screen is overlapped with the slider bar 11, or to tap the position on the slider bar 11, thereby moving the slider thumb 12 to the position. More specifically, the processing unit 101a performs, to the display control unit 101b, an instruction to change the position where the slider thumb 12 is to be drawn, based on the user's instruction detected by the operation input unit 102. The display control unit 101b receives the instruction from the processing unit 101a and performs drawing of the slider thumb 12 at the changed position. Moreover, the user performs a drug-and-drop operation or a swipe operation of the slider thumb 12, thereby holding and moving the slider thumb 12 on the slider bar 11.

The processing unit 101a detects a position of the cursor 21 operated by the user on the display screen, or a position of the slider control 10 (the slider bar 11 and the slider thumb 12) on the display screen. Further, the processing unit 101a determines, based on such information, an overlapping state of each of the slider bar 11 and the slider thumb 12 with respect to the cursor 21 on the display screen. The processing unit 101a then decides, based on a condition corresponding to a result of the determination, information relating to the slider control 10 to be displayed on the display unit 103.

In the present exemplary embodiment, a case where the information relating to the slider control 10 is displayed as a tooltip 22 is described. When the user overlaps the cursor 21 with an item on the GUI, the tooltip 22 displays information relating to the item. Although the tooltip 22 is displayed at an arbitrary position on the display screen, a case where the tooltip 22 is displayed near the cursor 21 is described in the present exemplary embodiment. The information relating to the slider control 10 is not limited to the case where the information is displayed in the tooltip 22, and can be displayed in an arbitrary form as long as the display form is recognizable by the user.

In the present exemplary embodiment, in a case where it is determined that the cursor 21 and the slider bar 11 are overlapped with each other, the processing unit 101*a* decides that a value of the slider thumb 12, which is to be applied when the slider thumb 12 moves to the position of the cursor 21, is displayed in the tooltip 22. In other words, the value corresponding to a relative position of the cursor 21 to the slider bar 11 is decided as a value to be displayed in the tooltip 22. Further, in the case where it is determined that the cursor 21 and the slider thumb 12 are overlapped with each other, the processing unit 101*a* decides that a value of the scale 13 corresponding to a current position of the slider thumb 12 (a current value of the slider thumb 12) is displayed in the tooltip 22.

Figure 2A:
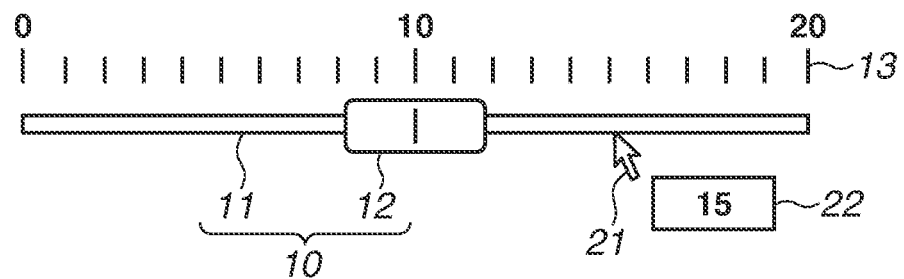
FIGS. 2A, 2B, 2C and 2D are diagrams each illustrating a display example of a graphical user interface (GUI) according to the exemplary embodiment of the present invention.
Figure 2B:
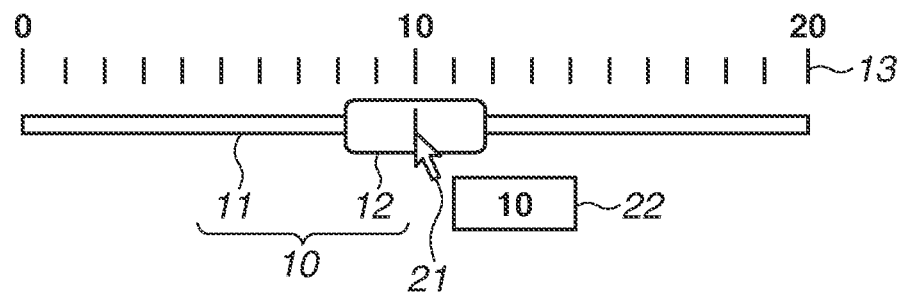
Figure 2C:
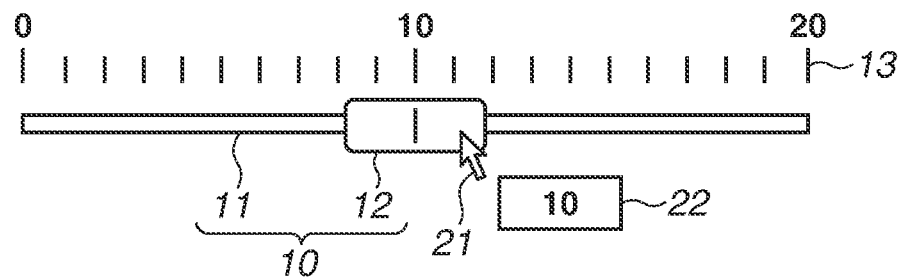

For example, as illustrated in FIG. 2A, in a case where the cursor 21 is located at a position of a value "15" of the scale 13 on the slider bar 11 but is not overlapped with the slider thumb 12, the processing unit 101*a* decides to display the value "15" in the tooltip 22. In contrast, as illustrated in FIG. 2B, in a case where the cursor 21 is overlapped with the slider thumb 12 and the slider thumb 12 is located at a position of a value "10" of the scale 13, the processing unit 101*a* decides to display the value "10" in the tooltip 22. Further, as illustrated in FIG. 2C, in a case where the cursor 21 is located at a position of a value "11" of the scale 13 but is located on the slider thumb 12, the processing unit 101*a* displays the value "10" currently indicated by the slider thumb 12 in the tooltip 22.

As described above, in a case where the mouse moves over the slider thumb 12, the processing unit 101*a* displays the current value of the slider thumb 12 in the tooltip even when a mouseover position is away from the position (center of the slider thumb 12) corresponding to the value currently indicated by the slider thumb 12. In other words, in the case where the mouse moves over the slider thumb 12, the processing unit 101*a* does not display, in the tooltip, the value when the slider thumb 12 moves to the mouseover position.

Figure 2D:
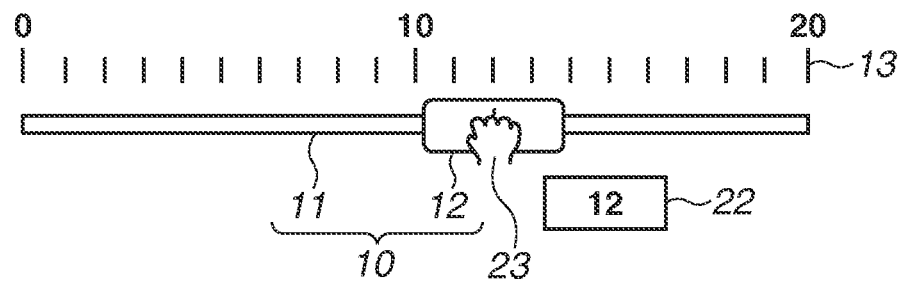

Moreover, the processing unit 101*a* displays, in the tooltip 22, the current value of the slider thumb 12 also while the user holds and moves the slider thumb 12 through the drag-and-drop operation or the swipe operation. In other words, in the case where the user holds the slider thumb 12 for the drag-and-drop operation or the swipe operation as illustrated in FIG. 2D, the processing unit 101*a* determines that a cursor 23 is located on the slider thumb 12. Accordingly, as illustrated in FIG. 2D, in a case where the slider thumb 12 is located at a value "12" of the scale 13, the value "12" that is the current value of the slider thumb 12 is displayed in the tooltip 22. As illustrated in FIGS. 2A to 2D, the value indicated by the slider thumb 12 corresponds to the value of the scale 13 corresponding to the center position of the slider thumb 12; however, this is not limitative, and a position of one of ends of the slider thumb 12 can use as a reference.

As described above, in the present exemplary embodiment, the processing unit 101*a* detects the position of the cursor 21, and changes the display condition of the tooltip 22 according to whether the cursor 21 is located on any of the slider bar 11 and the slider thumb 12 that configure the slider control 10.

An operation of the information processing apparatus 100 is described below with reference to FIG. 3. The processing illustrated in FIG. 3 starts in response to, for example, detection of an input of a start instruction from the user. The start timing of the processing in FIG. 3, however, is not limited to the above-described timing. The processing of FIG. 3 is realizable, for example, when the components illustrated in FIG. 1 operate as the hardware illustrated in FIG. 10. In this case, the dedicated hardware operates under control of the CPU 221 serving as the processor. More specifically, the information processing apparatus 100 reads a program necessary for the CPU 221 from the ROM 222 to the RAM 223, and executes the program to realize the processing illustrated in FIG. 3.

First, in step S1, the processing unit 101*a* detects a position of the cursor 21 (the cursor 23). In addition, in step S1, the processing unit 101*a* previously holds positions of the slider bar 11 and the slider thumb 12 that configure the slider control 10. Next, in step S2, the processing unit 101*a* determines the overlapping state of the cursor 21 (the cursor 23) and the slider thumb 12, based on positional information detected in step S1. In a case where the processing unit 101*a* determines that the cursor 21 is overlapped with the slider thumb 12, namely, the cursor 21 is located on the slider thumb 12 (Yes in step S2), the processing proceeds to step S3. In step S3, the processing unit 101*a* decides to display the current value of the slider thumb 12 in the tooltip 22. The display control unit 101*b* displays the current value of the slider thumb 12 as the tool-tip 22 on the display unit 103, and the processing then ends.

On the other hand, in a case where the processing unit 101*a* determines in step S2 that the cursor position is not overlapped with the slider thumb 12 (No in step S2), the processing proceeds to step S4. In step S4, the processing unit 101*a* determines the overlapping state of the cursor 21 (or the cursor 23) with the slider bar 11 based on the positional information detected in step S1, and determines whether the cursor position is overlapped with the slider bar 11. In a case where the processing unit 101*a* determines that the cursor position is overlapped with the slider bar 11 (Yes in step S4), the processing proceeds to step S5. In step S5, the processing unit 101*a* decides to display, in the tooltip 22, a value when the slider thumb 12 moves to the cursor position detected in step S1. The display control unit 101*b* displays the tooltip 22 on the display unit 103 according to the decision by the processing unit 101*a*, and the processing then ends.

Further, in a case where the processing unit 101*a* determines that the cursor position is not overlapped with the slider bar 11, namely, the cursor position is located neither on the slider 11 nor on the slider thumb 12 (No in step S4), the processing ends as is without displaying the tooltip 22.

As described above, the information processing apparatus 100 according to the present exemplary embodiment determines the overlapping state of the cursor 21 or the cursor 23 with each of the slider bar 11 and the slider thumb 12 that configure the slider control 10, on the display screen of the display unit 103. In addition, the information processing apparatus 100 decides the information relating to the slider control 10 that is to be displayed on the display unit 103, based on the condition corresponding to the determination result of the overlapping state described above. Thereafter, the information processing apparatus 100 performs the display control to display the decided information on the display unit 103.

More specifically, in the case where the cursor 21 and the slider bar 11 are overlapped with each other, the information processing apparatus 100 decides, as the information relating to the slider control 10, information relating to a value of the slider thumb 12 in the case where the slider thumb 12 moves to the position of the cursor 21. Further, in the case where the slider thumb 12 and the cursor 21 (or the cursor 23) is overlapped with each other, the information processing apparatus 100 decides, as the information relating to the slider control 10, information relating to a current value of the slider thumb 12.

In the present exemplary embodiment, the information processing apparatus 100 displays the information relating to the slider control 10 as the tooltip 22 when the mouse moves over the slider control 10. At this time, in a case where the mouse moves over the slider 11, the information processing apparatus 100 displays, in the tooltip 22, a value that is to be applied when the slider thumb 12 moves to the mouse-over position. In contrast, in the case where the mouse moves over the slider thumb 12, the information processing apparatus 100 displays a current value of the slider thumb 12 in the tooltip 22. In other words, even when the mouse-over position is away from the current value of the slider thumb 12, the value that is to be applied when the slider thumb 12 moves to the mouse-over position is not displayed in the tooltip 22, but the current value is displayed in the tool-tip 22.

It can be considered that, when the mouse moves over the slider control, the value that is to be applied when the slider thumb 12 moves to the cursor position (value of destination) is uniformly displayed in the tooltip. In this case, however, in the case where the mouse moves over the slider thumb 12 and the position of the mouse is away from the current value of the slider thumb 12, the value that is to be applied when the slider thumb 12 moves to the mouse-over position is displayed in the tooltip. In other words, the value different from the current value of the slider thumb 12 is displayed in the tooltip. This makes the user difficult to grasp the current position of the slider thumb 12, which may deteriorate operability of the slider control.

In contrast, in the present exemplary embodiment, the overlapping state of the cursor 21 (or the cursor 23) with the slider thumb 12 is determined, and the current value of the slider thumb 12 is displayed in the tooltip 22 irrespective of the cursor position in the case where the mouse moves over the slider thumb 12. Accordingly, the information different from the current value of the slider thumb 12 is not displayed while the mouse is positioned over the slider thumb 12, which allows the user to appropriately grasp the current value of the slider thumb 12.

The current value of the slider thumb 12 can be constantly displayed at an arbitrary position on the display screen. The information processing apparatus can display the tooltip only in a case where the mouse moves over the slider bar 11. The tooltip displayed at this time can be a value that is to be applied when the slider thumb 12 moves to the cursor position. Also in this case, in a case where the mouse moves over the slider thumb 12, the information different from the current value of the slider thumb 12 is not displayed, which allows the user to appropriately grasp the current value of the slider thumb 12.

As described above, it is possible for the information processing apparatus 100 to appropriately present the information relating to the slider control 10 to the user. This allows the user to appropriately grasp the current position of the slider thumb 12. As a result, it is possible to improve operability of the slider control. The present exemplary embodiment is effective to a case where the information relating to the slider control 10, which includes the slider thumb 12 with the large size astride a plurality of scales, is displayed in the tooltip.

In the above description, the case, in which the display condition of the tooltip 22 is changed between the case where the cursor is overlapped with the slider bar 11 and the case where the cursor is overlapped with the slider thumb 12, has been described. Further, a display method of the tooltip 22 can be changed between the case where the cursor is overlapped with the slider bar 11 and the case where the cursor is overlapped with the slider thumb 12.

Figure 4A:
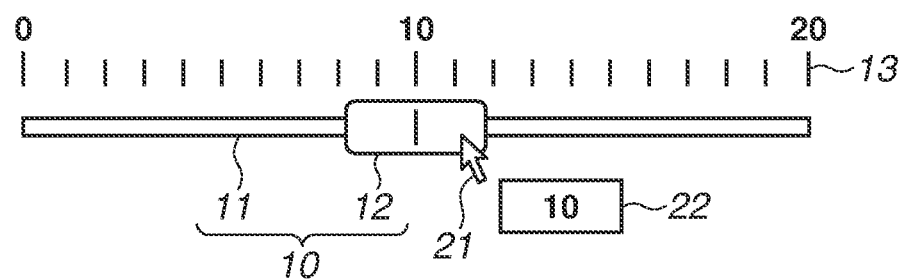
FIGS. 4A and 4B are diagrams each illustrating a display example of the GUI according to the exemplary embodiment of the present invention.
Figure 4B:
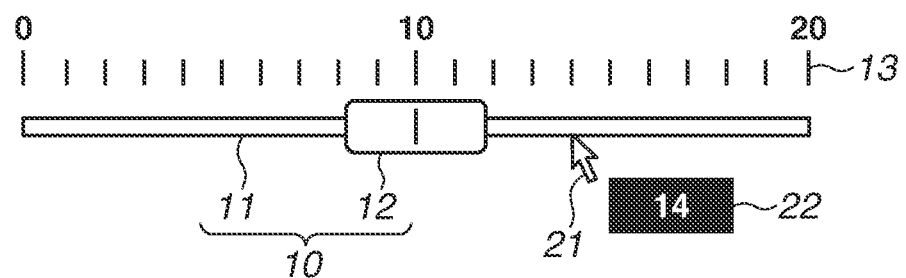

FIGS. 4A and 4B each illustrate another example of the slider control 10 displayed on the display unit 103.

FIG. 4A illustrates a case where the cursor 21 is overlapped with the slider thumb 12, and FIG. 4B illustrates a case where the cursor 21 is overlapped with the slider bar 11. The display contents of the tooltip 22 are similar to those of FIGS. 2A to 2D described above. In other words, as illustrated in FIG. 4A, the current value of the slider thumb 12 is displayed in the tooltip 22 in the case where the cursor 21 is located on the slider thumb 12. In contrast, as illustrated in FIG. 4B, in the case where the cursor 21 is not located on the slider thumb 12 but is located on the slider bar 11, the value that is to be applied when the slider thumb 12 moves to the position of the cursor 21 is displayed in the tooltip 22.

In the present exemplary embodiment, a color of the tooltip 22 is changed between the case where the cursor 21 is overlapped with the slider bar 11 and the case where the cursor 21 is overlapped with the slider thumb 12. This allows the user to easily recognize whether the cursor 21 is placed on the slider thumb 12 or on the slider bar 11. Further, it is possible for the user to easily determine whether the value displayed in the tooltip 22 is the current value of the slider thumb 12.

As described above, the information processing apparatus 100 according to the present exemplary embodiment changes the display method of the tooltip 22 between the case where the cursor is overlapped with the slider bar 11 and the case where the cursor is overlapped with the slider thumb 12. This allows the user to intuitively recognize whether the display contents of the displayed tooltip 22 indicate the current value of the slider thumb 12 or the value of the destination when the user clicks.

In FIGS. 4A and 4B, the color of the tooltip 22 is changed between the case where the cursor 21 is overlapped with the slider thumb 12 and the case where the cursor 21 is overlapped with the slider bar 11. It is, however, sufficient for the display method to allow recognition of difference between the case where the cursor 21 is overlapped with the slider thumb 12 and the case where the cursor 21 is overlapped with the slider bar 11. In other words, a shape of the tooltip, a font of characters, etc. can be changed without limitation to the color.

Figure 5A:
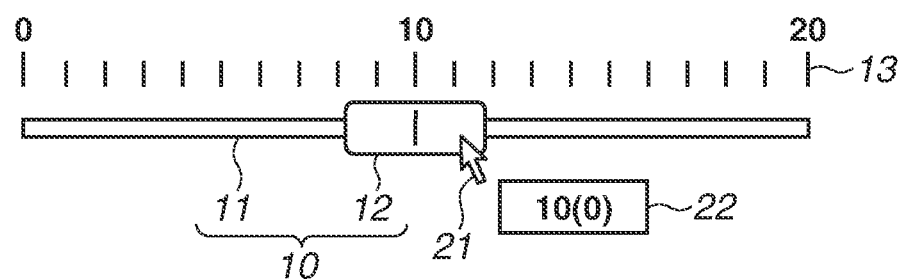
FIGS. 5A and 5B are diagrams each illustrating a display example of the GUI according to the exemplary embodiment of the present invention.
Figure 5B:
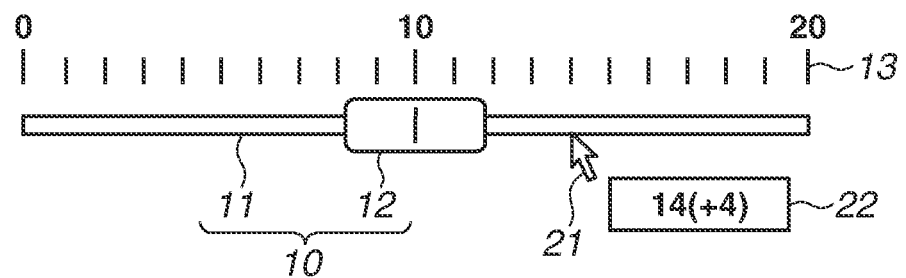

Further, the display contents of the tooltip 22 are not limited to the contents illustrated in FIGS. 4A and 4B. As illustrated in FIGS. 5A and 5B, a difference value between the current value of the slider thumb 12 and a value displayed as the tooltip can be additionally displayed in the tooltip 22. In the tooltip 22 illustrated in FIGS. 5A and 5B, a numerical value in parentheses is the above-described difference value. FIG. 5A illustrates a display example in a case where the current value of the slider thumb 12 is "10" and the cursor 21 is located on the slider thumb 12. In this case, the difference value "0" is displayed in the tooltip 22 in addition to the current value "10" of the slider thumb 12.

FIG. 5B illustrates a display example in a case where the cursor 21 is located on a scale "14" on the slider bar 11. In this case, a difference value "+4" between the current value "10" of the slider thumb 12 and the value "14" corresponding to the cursor position is displayed in the tooltip 22 in addition to the value "14" corresponding to the cursor position. This allows the user to easily recognize whether the cursor 21 is placed on the slider thumb 12 or on the slider bar 11. Moreover, it is possible for the user to easily grasp a changing degree of the value of the slider thumb 12 from the current value in the case where the slider thumb 12 moves to the cursor position.

The case where the difference value is additionally displayed has been described in FIGS. 5A and 5B; however, only the difference value can be displayed.

Figure 6A:
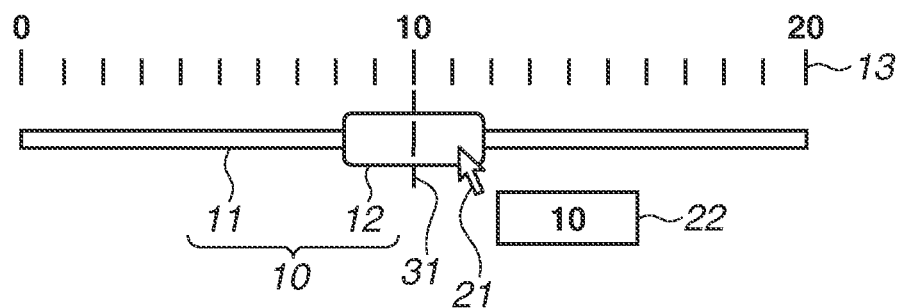
FIGS. 6A and 6B are diagrams each illustrating a display example of the GUI according to the exemplary embodiment of the present invention.
Figure 6B:
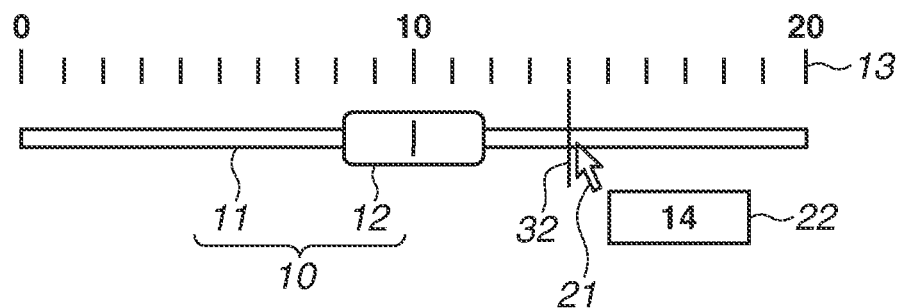

Further, as illustrated in FIGS. 6A and 6B, a line 31 or 32 can be displayed at a position of the scale corresponding to the value displayed in the tooltip 22, in addition to display of the value as the tooltip 22. FIG. 6A illustrates a display example in a case where a current value of the slider thumb 12 is "10" and the cursor 21 is located on the slider thumb 12. In this case, the line 31 is displayed on an extension of the scale of the current value "10" of the slider thumb 12. In addition, as illustrated in FIG. 6B, in a case where the cursor 21 is located on the scale "14" on the slider bar 11, the line 32 is displayed on an extension of the scale of the value "14" corresponding to the cursor position.

In this case, it is possible for the user to easily grasp the value that is to be applied when the slider thumb 12 moves to the cursor position, which improves operability of the slider control 10. The cases where the lines 31 and 32 are displayed on the extension of the scale are described in FIGS. 6A and 6B, respectively; however, an arbitrary marker can be used without limitation to the line.

In the above-described exemplary embodiment, the contents relating internal processing of the information processing apparatus 100 have been described. In the following, a system in which the information processing apparatus 100 is connected to a network camera through a network in the present exemplary embodiment is described.

Figure 7:
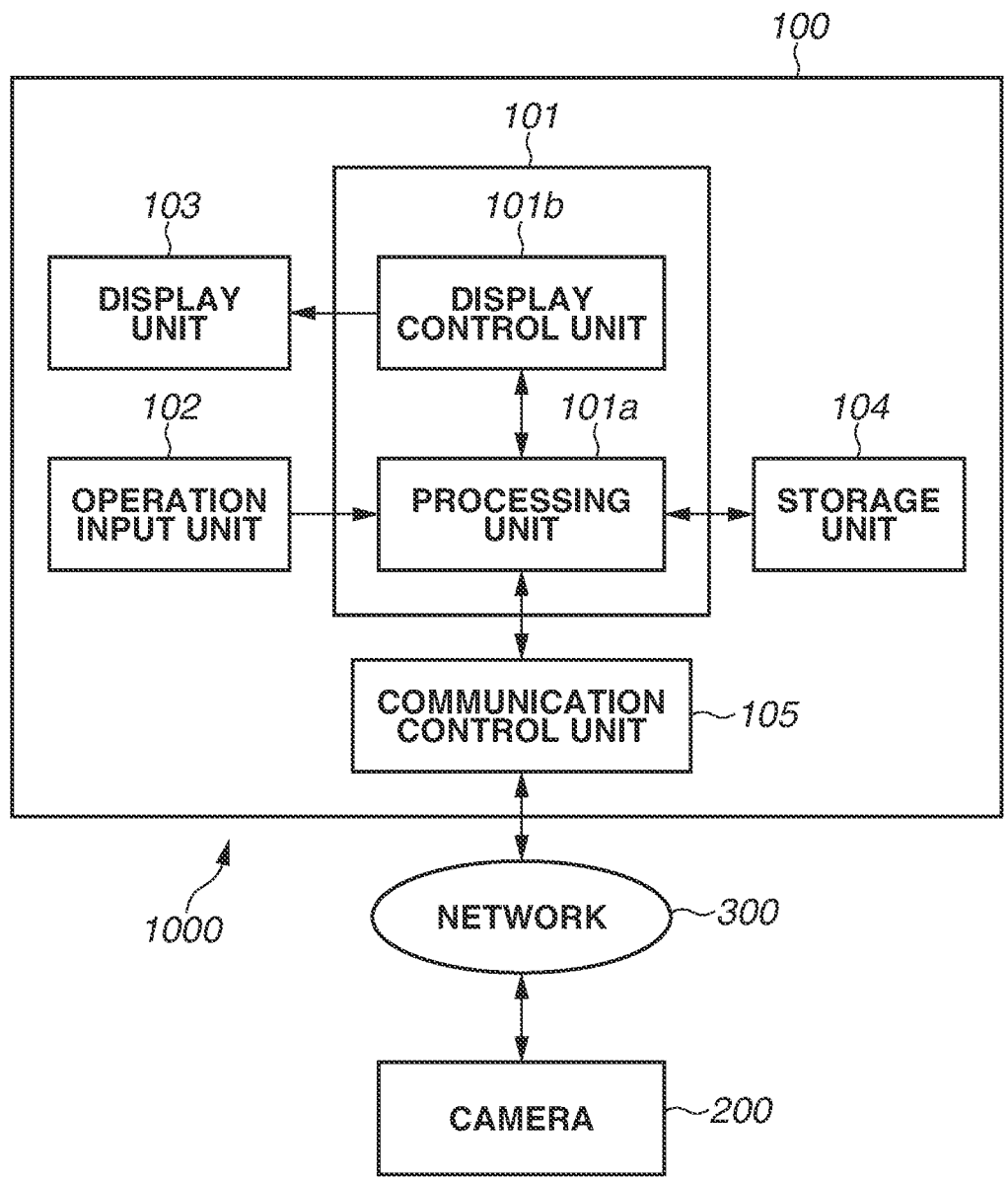
FIG. 7 illustrates a configuration example of an imaging system according to the exemplary embodiment of the present invention.

FIG. 7 is a diagram illustrating a configuration example of an imaging system 1000 according to the present exemplary embodiment. The imaging system 1000 includes the information processing apparatus 100 and the network camera 200. The information processing apparatus 100 and the network camera 200 are connected to each other through a network 300. In the following, the network camera 200 is abbreviated to the camera 200.

The camera 200 is an image capturing apparatus that captures an image of an object, and is configured to transmit a captured image to the image processing apparatus 100 through the network 300. The network 300 can include, for example, the internet, a wired local area network (LAN), a wireless LAN, a wide area network (WAN), or an analog cable. A communication standard, a scale, and a configuration of the network 300 are not particularly limited. Further, for example, Ethernet® can be used as the communication standard of LAN. As a network protocol, transmission control protocol/internet protocol (TCP/IP) (user datagram protocol/internet protocol (UDP/IP)) can be used.

A physical connection form to the network 300 can be a wired or wireless form. Moreover, although one information processing apparatus 100 and one camera 200 are connected to the network 300 in FIG. 7, the number of the information processing apparatus and the camera to be connected is not limited to the number illustrated in FIG. 7.

The information processing apparatus 100 illustrated in FIG. 7 has the same configuration as that of the information processing apparatus 100 illustrated in FIG. 1 except that the information processing apparatus 100 illustrated in FIG. 7 includes a communication control unit 105. The communication control unit 105 includes an interface for communication with an external apparatus (the camera 200 in present exemplary embodiment). The communication control unit 105 can receive an image transmitted from the camera 200, through the network 300.

Further, the communication control unit 105 can transmit, to the camera 200, a control signal to control the camera 200 through the network 300 according to a user's instruction provided through the operation input unit 102. In this case, the communication control unit 105 can receive, from the camera 200, a response to the control signal transmitted to the camera 200. The response from the camera 200 includes parameters that are requested to the camera 200 by the information processing apparatus 100, information indicating whether the control signal transmitted to the camera 200 has been executed in the camera 200, etc. Examples of the signal to control the camera 200 include a signal to control an imaging condition such as an exposure correction value of the camera 200 and an aperture value of a lens, and a signal to control panning, tilting, and zooming of the camera 200. The signal is generated as the control signal corresponding to a position indicated by the slider thumb 12 by moving the slider thumb 12 on the slider bar 11, and the generated signal is transmitted to the camera 200 through the communication control unit 105.

Figure 8A:
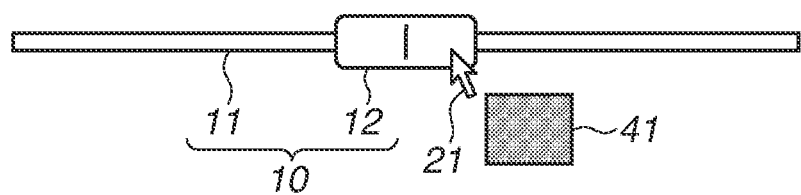
FIGS. 8A and 8B are diagrams each illustrating a display example of the GUI according to the exemplary embodiment of the present invention.
Figure 8B:
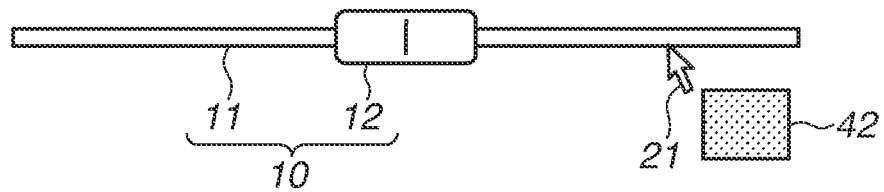

FIGS. 8A and 8B each illustrate a display example of the slider control 10 displayed on the display unit 103 for setting the exposure correction value of the camera 200. FIG. 8A illustrates the display example in a case where the cursor 21 is overlapped with the slider thumb 12, and FIG. 8B illustrates the display example in a case where the cursor 21 is overlapped with the slider bar 11. The exposure correction value is varied to a plus side and the image captured by the camera 200 becomes brighter as the slider thumb 12 moves rightward in FIGS. 8A and 8B.

In this case, the processing unit 101a of the information processing apparatus 100 displays, in the tooltip, information relating to the exposure correction value of the camera 200 as the information relating to the slider control 10. More specifically, in the case where the cursor 21 and the slider thumb 12 are overlapped with each other, the processing unit 101a displays, in the tooltip, an image having the brightness that is obtained through image-capturing using an exposure correction value currently set in the slider thumb 12. In other words, as illustrated in FIG. 8A, in the case where the cursor 21 is located on the slider thumb 12, a tooltip 41 of the brightness corresponding to the image at the current position indicated by the slider thumb 12 (center of slider thumb 12) is displayed.

In contrast, in the case where the cursor 21 and the slider thumb 12 are not overlapped with each other but the cursor 21 and the slider bar 11 are overlapped with each other, the processing unit 101a displays, in the tooltip, an image having the brightness obtained through image-capturing using an exposure correction value that is to be set when the slider thumb 12 moves to the cursor position.

When the slider thumb 12 moves from the state illustrated in FIG. 8A to the position of the cursor 21 in FIG. 8B, the image becomes brighter than the image at the current position of the slider thumb 12. Therefore, as illustrated in FIG. 8B, in a case where the cursor 21 is located at a position on the plus side as compared with the current exposure correction value on the slider bar 11, a tooltip 42 that is brighter than the tooltip 41 is displayed. This allows the user to easily grasp how the brightness of the captured image changes when the user operates the slider thumb 12. In place of the images of the tooltips 41 and 42, an exposure value as is can be displayed in the tooltip in a manner similar to FIGS. 2A to 2D and 4A to 6B.

Figure 9A:
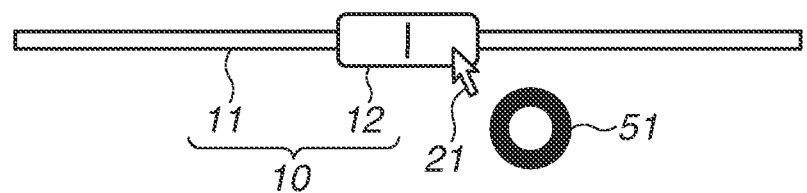
FIGS. 9A and 9B are diagrams each illustrating a display example of the GUI according to the exemplary embodiment of the present invention.
Figure 9B:
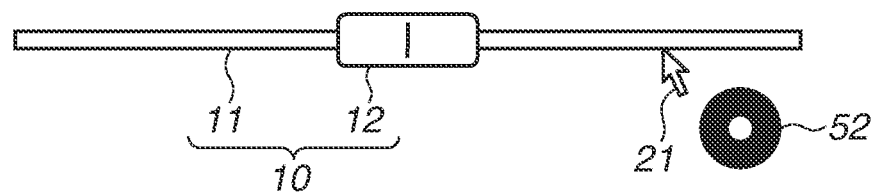

FIGS. 9A and 9B each illustrate a display example of the slider control 10 displayed on the display unit 103 for setting the aperture value of the lens of the camera 200. FIG. 9A illustrates the display example in the case where the cursor 21 is overlapped with the slider thumb 12, and FIG. 9B illustrates the display example in the case where the cursor 21 is overlapped with the slider bar 11. A tooltip 51 and a tooltip 52 are images each representing the aperture value, and each represent an opening degree of a diaphragm.

The diaphragm of the lens is closed as the slider thumb 12 moves rightward in FIGS. 9A and 9B. In other words, when the slider thumb 12 moves from the state illustrated in FIG. 9A to a position of the cursor 21 in FIG. 9B, the diaphragm of the lens is closed. Accordingly, in such a case, an icon representing that the diaphragm is closed as compared with the tooltip 51 may be displayed in the tooltip 52. This allows the user to easily grasp how the diaphragm of the lens changes when the user operates the slider thumb 12. In place of the images of the tooltips 51 and 52, an actual aperture value can be displayed in the tooltip in a manner similar to FIGS. 2A to 2D and 4A to 6B.

Further, as with FIGS. 2A to 2D and 4A to 6B, the present invention is applicable even to a case where the slider control 10 is used to control panning, tilting, and zooming. For example, in the case where the cursor 21 is overlapped with the slider thumb 12, a value of panning, tilting, or zooming corresponding to the position indicated by the slider thumb 12 (a center position of the slider thumb 12) is displayed in the tooltip. In the case where the cursor 21 is not overlapped with the slider thumb 12 but the cursor 21 and the slider bar 11 are overlapped with each other, a value of panning, tilting, or zooming that is to be set when the slider thumb 12 moves to the cursor position is displayed in the tooltip.

Moreover, as with FIGS. 8A to 9B, in the case where the slider control 10 is used to control panning, tilting, or zooming, a captured image of a corresponding view angle can be displayed in the tooltip. For example, in the case where the cursor 21 is overlapped with the slider thumb 12, a captured image of the view angle corresponding to the position indicated by the slider thumb 12 (the center position of the slider thumb 12) is displayed in the tooltip. Further, in the case where the cursor 21 is not overlapped with the slider thumb 12 but the cursor 21 and the slider bar 11 are overlapped with each other, the captured image of the view angle corresponding to the cursor position is displayed in the tooltip.

As described above, the information processing apparatus 100 according to the present exemplary embodiment displays, in the tooltip, the information relating to the imaging condition of the image capturing apparatus in the slider control 10 for setting the imaging condition of the image capturing apparatus as the information relating to the slider control 10. At this time, in a case where the imaging condition of the image capturing apparatus is the exposure correction value, the information relating to the imaging condition of the image capturing apparatus can be an image having the brightness obtained through image-capturing using the exposure correction value. Further, in the case where the imaging condition of the image capturing apparatus is the aperture value of the lens, the information relating to the imaging condition of the image capturing apparatus can be an image representing the aperture value. This allows the user to easily grasp how the imaging condition changes when the user operates the slider thumb 12.

In the present exemplary embodiment, the settings of the imaging condition such as the exposure correction value and the aperture value of the camera 200 have been described; however, the present exemplary embodiment can be used for other imaging conditions. For example, the imaging condition can include white balance, a shutter speed, and various kinds of parameters in image processing.

Other Embodiments

Aspects of the present invention can also be realized by supplying programs achieving one or more functions of the above-described exemplary embodiment(s) to a system or an apparatus through a network or a storage medium and causing one or more processors of a computer in the system or the apparatus to read and execute the programs. Further, the present invention can be realized by a circuit (e.g., application specific integrated circuit (ASIC)) for performing one or more functions of the above-described exemplary embodiment(s).

The present invention makes it possible to appropriately present the information relating to the slider control to the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-052166, filed Mar. 17, 2017, which is hereby incorporated by reference herein in its entirety.

What is claimed is:

1. A control apparatus of a network camera, the control apparatus comprising:
   circuitry configured to:
   display, on a display screen, a slider control including a slider bar and a slider thumb which is moveable on the slider bar, a scale indicating a position of the slider thumb, and slider control information that relates to the slider control, wherein the slider thumb extends over a plurality of values on the scale,
   determine an overlapping state of a cursor with the slider bar and with the slider thumb on the display screen and determine the slider control information based on the determination of the overlapping state, and
   transmit, to the network camera, a control signal corresponding to the position of the slider thumb, wherein the control signal is changed in response to an input of an instruction by a user,
   wherein, in a case where the circuitry determines that the cursor is located on the slider bar, the circuitry determines, as the slider control information, information relating to a value of the slider thumb if the slider thumb moves to a position of the cursor,
   wherein, in a case where the circuitry determines that the cursor and the slider thumb are overlapped with each other and the cursor is located at a position corresponding to a current value of the slider thumb, the circuitry determines, as the slider control information, information relating to the current value of the slider thumb, and
   wherein, in a case where the circuitry determines that the cursor and the slider thumb are overlapped with each other and the cursor is located at a position corresponding to a value different from the current value of the slider thumb, the circuitry determines, as the slider control information, the information relating to the current value of the slider thumb.

2. The control apparatus according to claim 1, wherein, in a case where the circuitry determines that the cursor is located on the slider bar, the circuitry determines, as the slider control information, a difference value between the current value of the slider thumb and the value of the slider thumb if the slider thumb moves to the position of the cursor.

3. The control apparatus according to claim 1, wherein the circuitry changes a method of displaying the slider control information between a case where the cursor and the slider thumb are overlapped with each other and a case where the cursor is located on the slider bar.

4. The control apparatus according to claim 3, wherein the circuitry changes one or more of a color, a shape, and a font of the slider control information.

5. The control apparatus according to claim 1,
wherein, in a case where the circuitry determines that the cursor is located on the slider bar, the circuitry determines, as the slider control information, a marker to be displayed at a position of the cursor, and
wherein, in a case where the circuitry determines that the cursor and the slider thumb are overlapped with each other, the circuitry determines, as the slider control information, a marker to be displayed at a current position of the slider thumb.

6. The control apparatus according to claim 1,
wherein the slider control is to set an imaging condition of an image capturing apparatus, and
wherein the circuitry determines, as the slider control information, information relating to the imaging condition of the image capturing apparatus.

7. The control apparatus according to claim 6,
wherein the imaging condition includes an exposure correction value of the image capturing apparatus,
wherein, in a case where the circuitry determines that the cursor is located on the slider bar, the circuitry determines, as the information relating to the imaging condition of the image capturing apparatus, an image having brightness obtained through image-capturing using the exposure correction value that is to be set when the slider thumb moves to a position of the cursor, and
wherein, in a case where the circuitry determines that the cursor and the slider thumb are overlapped with each other, the circuitry determines, as the information relating to the imaging condition of the image capturing apparatus, an image having brightness obtained through image-capturing using the exposure correction value currently set.

8. The control apparatus according to claim 6,
wherein the imaging condition includes an aperture value of the image capturing apparatus,
wherein, in a case where the circuitry determines that the cursor and the slider bar are overlapped with each other, the circuitry determines, as the information relating to the imaging condition of the image capturing apparatus, an image representing the aperture value that is to be set when the slider thumb moves to a position of the cursor, and
wherein, in a case where the circuitry determines that the cursor and the slider thumb are overlapped with each other, the circuitry determines, as the information relating to the imaging condition of the image capturing apparatus, an image representing the aperture value currently set.

9. The control apparatus according to claim 1, wherein the circuitry displays, as a tooltip and on the display screen, the determined information.

10. A method for a control apparatus of a network camera, the method comprising:
displaying, on a display to screen, a slider control including a slider bar and a slider thumb which is moveable on the slider bar, a scale indicating a position of the slider thumb, and slider control information that relates to the slider control, wherein the slider thumb extends over a plurality of values on the scale;
determining an overlapping state of a cursor with the slider bar and with the slider thumb on the display screen and determining the slider control information based on the determination of the overlapping state; and
transmitting, to the network camera, a control signal corresponding to the position of the slider thumb, wherein the control signal is changed in response to an input of an instruction by a user,
wherein, in a case where it is determined that the cursor is located on the slider bar, determining includes determining, as the slider control information, information relating to a value of the slider thumb if the slider thumb moves to a position of the cursor,
wherein, in a case where it is determined that the cursor and the slider thumb are overlapped with each other and the cursor is located at a position corresponding to a current value of the slider thumb, determining includes determining, as the slider control information, information relating to the current value of the slider thumb, and
wherein, in a case where it is determined that the cursor and the slider thumb are overlapped with each other and the cursor is located at a position corresponding to a value different from the current value of the slider thumb, determining includes determining, as the slider control information, the information relating to the current value of the slider thumb.

11. The method according to claim 10, wherein, in a case where it is determined that the cursor is located on the slider bar, determining includes determining, as the slider control information, a difference value between the current value of the slider thumb and the value of the slider thumb if the slider thumb moves to the position of the cursor.

12. The method according to claim 10, wherein determining includes changing a method of displaying the slider control information between a case where the cursor and the slider thumb are overlapped with each other and a case where the cursor is located on the slider bar.

13. The method according to claim 12, wherein determining includes changing one or more of a color, a shape, and a font of the slider control information.

14. A non-transitory computer readable medium storing a program to execute a method for a control apparatus of a network camera, the method comprising:
displaying, on a display screen, a slider control including a slider bar and a slider thumb which is moveable on the slider bar, a scale indicating a position of the slider thumb, and slider control information that relates to the slider control, wherein the slider thumb extends over a plurality of values on the scale;
determining an overlapping state of a cursor with the slider bar and with the slider thumb on the display screen and determining the slider control information based on the determination of the overlapping state; and transmitting, to the network camera, a control signal corresponding to the position of the slider thumb, wherein the control signal is changed in response to an input of an instruction by a user, wherein, in a case where it is determined that the cursor is located on the slider bar, determining includes determining, as the slider control information, information relating to a value of the slider thumb if the slider thumb moves to a position of the cursor, wherein, in a case where it is determined that the cursor and the slider thumb are overlapped with each other and the cursor is located at a position corresponding to a current value of the slider thumb, determining includes determining, as the slider control information, information relating to the current value of the slider thumb, and wherein, in a case where it is determined that the cursor and the slider thumb are overlapped with each other and the cursor is located at a position corresponding to a value different from the current value of the slider thumb, determining includes determining, as the slider control information, the information relating to the current value of the slider thumb.

15. The non-transitory computer readable medium according to claim 14, wherein, in a case where it is determined that the cursor is located on the slider bar, determining includes determining, as the slider control information, a difference value between the current value of the slider thumb and the value of the slider thumb if the slider thumb moves to the position of the cursor.

16. The non-transitory computer readable medium according to claim 14, wherein determining includes changing a method of displaying the slider control information between a case where the cursor and the slider thumb are overlapped with each other and a case where the cursor is located on the slider bar.

17. The non-transitory computer readable medium according to claim 16, wherein determining includes changing one or more of a color, a shape, and a font of the slider control information.

* * * * *